United States Patent Office 2,842,453
Patented July 8, 1958

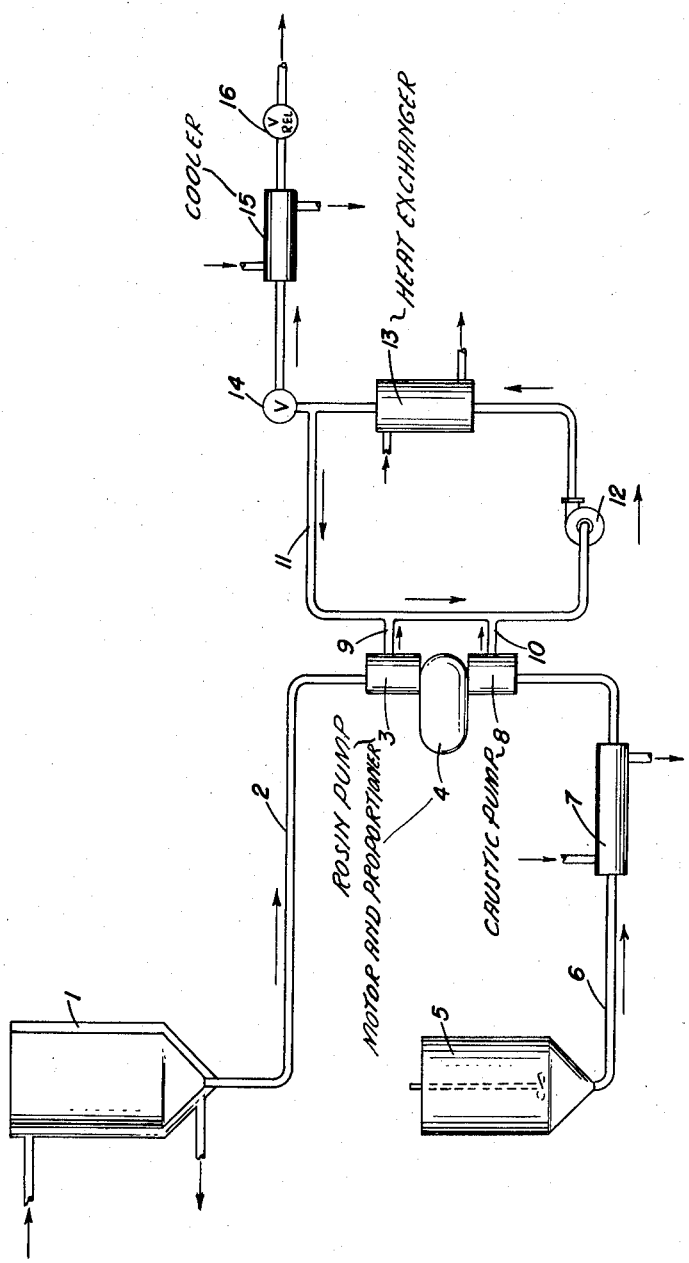

2,842,453

CONTINUOUS MANUFACTURE OF LIQUID ROSIN SIZE

Joseph M. Anderson, Pine Beach, N. J., and Floyd B. Porter, Jr., Watertown, Conn., assignors to American Cyanamid Company, New York, N. Y., a corporation of Maine Application May 6, 1955, Serial No. 506,584

8 Claims. (Cl. 106—238)

The present invention relates to the continuous saponification of rosin and like high molecular weight organic acids to form corresponding liquid rosin size, and to apparatus therefor. More particularly the present invention relates to a continuous method for manufacturing liquid rosin size wherein molten rosin or similar acid is continuously dispersed in hot aqueous alkali metal alkali solution containing a recirculated autogenously formed alkali metal salt of the rosin acid as dispersing agent. Liquid rosin size is formed from the thus dispersed rosin either in the apparatus employed or while the product is being pumped to storage as may be preferred.

Rosin size is an article of commerce principally used as a sizing agent for paper. It consists principally of the fully or partially neutralized alkali metal (generally sodium) soaps of rosin or like high molecular weight rosin acids and may contain varying amounts of water. In commercial practice the size contains between about 50%–60% and 80% by weight of solids. Where the liquid size is made for use as such, the size generally contains 5% to 25% by weight of free rosin acids. Where the size is manufactured for conversion to dry size, it is customary to use sufficient caustic to yield a practically neutral product. To prevent gelation liquid rosin size is stored and shipped at temperatures above about 60° C.

Liquid rosin size may be and currently is manufactured from a variety of materials including naturally-occurring rosins such as gum rosin and wood rosin as well as from tall oil rosin and abietic acid. Moreover at least partially disproportionated rosins and at least partially hydrogenated rosins have been used.

Recently it has been found possible to increase the water repellence imparted by the size by first reacting any of the naturally-occurring rosins with between about 1/12 and 1/4 mol of a compound of acidic character containing the —CO—C=C group, including the $\alpha,\beta$-unsaturated dicarboxylic acids or anhydrides; see U. S. Patents Nos. 2,383,933 and 2,628,918. Maleic anhydride is commercially employed because of its ready availability, and the acids formed by dehydration of citric acid are known to give good results. Such rosins are generally known as "fortified rosins" and the sizes prepared therefrom are generally known as "fortified rosin sizes." Fortified rosin size may also be made by reacting one mol of rosin with up to one mol of maleic anhydride or the equivalent, saponifying the product, and diluting the size thus obtained with ordinary liquid rosin size as necessary.

The term "rosin" as used herein designates any of the foregoing rosins and the term "liquid rosin size" designates liquid sizes prepared therefrom.

At the present time liquid rosin size is generally prepared by the "cook tank" method. In this method a caustic-resistant tank is employed typically holding from 6,000 to 18,000 gallons (one to three tank car loads) or more, into which molten rosin and hot aqueous alkali metal alkali solution are fed in separate streams. Agitation is provided by steam issuing from pipes on the bottom of the tank and by propeller-type stirrers as well. Saponification of the rosin requires at least about an hour. Usually about two hours are allowed, after which the product is considered ready for shipment or use. This method of manufacture has several disadvantages including the following.

(1) Considerable space is required for the cook tank.

(2) A large volume of steam is evolved which diffuses a soapy mist around the cook tank. The film of soap provides slippery footing and this, together with the steam and heat, renders the operation a hazardous and disagreeable one.

(3) The process is inefficient, in that large amounts of heat are wasted by radiation and by conversion into steam.

(4) The size produced is apt to be non-uniform resulting from separation of the product into two layers of distinctively different viscosities, composition and color. The agitation is generally unable to maintain the size in a state of complete homogeneity.

The discovery has now been made that liquid rosin size can be rapidly, efficiently, and uniformly made in compact apparatus by a continuous process which involves two principal features. First, molten rosin and hot aqueous alkali metal alkali solution in a liquid size making proportion are continuously and separately supplied under pressure to a closed circuit reactor containing circulating means and means for dispersing the molten rosin in the alkali metal alkali solution containing an effective amount of autogenously and pre-formed alkali metal rosinate as dispersing agent for the rosin, whereby the surface of the rosin is greatly extended and the rosin in the form of minute droplets is thoroughly mixed with the alkali solution. Second, at least sufficient of the rosin reacts with the alkali solution to act, on recirculation, as dispersing agent for the rosin present and to maintain dispersed particles in unaggregated form until substantially all of the alkali metal alkali has reacted. Product is continuously discharged from the reactor and sent to storage. The product on discharge typically consists essentially of an emulsion of rosin in aqueous alkali metal alkali solution containing sodium rosinate as emulsifying agent. Reaction of the alkali metal alkali with the emulsified rosin takes place during the few minutes that the product is in transit to storage, a tank car, or a paper making beater. It is within the scope of the invention however to retain the product in the reactor until substantially all of the alkali metal alkali has reacted with the rosin therein.

The foregoing process has the following advantages.

(1) It is rapid, efficient, and flexible. A contact time in the reactor of only a fraction of a minute is usually enough to form an emulsion or dispersion sufficiently stable to be discharged from the reactor. The apparatus is compact, so that heat losses are reduced to a minimum. Changes in raw materials or reaction conditions are immediately reflected in the product, permitting one reactor to be used for the production of a variety of sizes. The output of the apparatus can be varied smoothly over a wide range, and the process lends itself to automation.

(2) The operation is safe and clean. The spatter of rosin soap and discomfort due to escaping steam are entirely suppressed.

(3) The product is uniform in composition and stratification of the size during manufacture does not occur.

(4) The dispersing agent required by the process is autogenously formed, so that nothing need be added.

The invention will be illustrated more particularly with relation to the drawing, which is a schematic flow diagram also illustrating one form of apparatus suitable for practice of the present invention. In the drawing, steam-jacketed rosin kettle 1 delivers molten rosin through rosin supply pipe 2 to one side 3 of proportioning pump 4, and aqueous alkali metal alkali supply tank 5 delivers alkali solution through supply pipe 6 provided with heat exchanger 7 to the other side 8 of the proportioning pump. The molten rosin and hot caustic solution respectively pass through pipes 9 and 10 to closed circuit reactor 11 containing centrifugal pump 12 as combined circulation and dispersing means. Heat exchanger 13 is provided to absorb the heat of reaction.

The closed circuit reactor discharges through stop valve 14, heat exchanger 15 and pressure reducing valve 16. All moving parts of the apparatus are "traced" with small-bore steam tubing to supply additional heat thereto and thus prevent solidification of rosin and rosin size therein. This tracing is conventional and therefore is not shown. In preferred operation rosin is melted under a blanket of inert gas in tank 1 and sodium hydroxide solution of suitable strength is pumped into tank 5. The two materials are pumped through proportioning pump 4 and are separately fed into the closed circuit reactor at a suitable temperature and pressure in size-making ratio, the caustic being heated (generally to a temperature somewhat below that of the rosin) in heat exchanger 7.

The temperature of the rosin should be such that it is quite fluid ensuring ready dispersion and this varies with the particular rosin selected. For natural rosins a temperature of 110°–120° C. is suitable while for most fortified rosins higher temperatures are needed; see U. S. Patent No. 2,383,933. Normally the system is under pressure so that all of the caustic solution remains in the liquid phase and formation of vapor is prevented.

The amount and strength of the caustic solution should be in liquid size making ratio, i. e., that sufficient to provide a liquid size containing between about 50% and 80% of solids and not more than about 30% free rosin (abietic) acid.

The caustic solution and/or rosin may contain such materials as have heretofore been employed in the manufacture of liquid size such as a lower alkanol, sodium chloride, potassium nitrate, or sodium acetate to decrease viscosity; phenothiazine or other secondary amine as antioxidant; and formaldehyde or saligenin as crystallization inhibitor.

The temperature of the reactor is most conveniently controlled by the use of heat exchanger 13. The temperature need be no greater than that at which the rosin is sufficiently fluid to undergo emulsification without need for excessive power.

The product is continuously discharged from heat exchanger 13 at any convenient temperature, usually at least about 70° C. Where saponification is not complete upon discharge a temperature of about 90° C.–100° C. is preferred. Cooler 15 and pressure reducing valve 16 permits the product to be discharged in a smooth stream without undue foaming.

It is within the scope of the invention, however, to make dry size by discharging the product under substantial pressure without cooling through a nozzle.

The residence time of the feed in the reactor is most easily controlled by adjustment of pump 4 and valve 14. If desired the residence time may be made so long that substantially all of the alkali reacts. The minimum effective duration to achieve this result depends upon independent variables such as the reactivity of the size, the precise temperature employed, the strength of the caustic, and the particle size of the dispersed rosin. This duration is thus most conveniently found by trial and in pilot plant work no more than about two minutes has been required at 110° C. On the other hand a product may be discharged when only a very minor amount of the alkali has reacted, and this is a principal feature of the invention. It is only necessary to form a dispersion of rosin which is sufficiently stable because of fine droplet size and the presence of rosin soap to remain in dispersed form at about 90° C. until substantially all the alkali therein has reacted. In other words the residence time of the feed in the reactor need be no longer than that necessary to permit sufficient alkali to react to form a dispersing medium for the unsaponified rosin present. Calculations indicate that in the case of the size referred to above not more than about fifteen seconds is required. In other words, the average residence time of the feed in the reactor need be no more than that sufficient to form a dispersion of rosin in an aqueous alkali metal alkali solution containing sufficient alkali metal rosinate to preserve the dispersion until substantially all the alkali metal alkali has reacted with the rosin. It will be appreciated that the speed of this reaction increases as the diameter of the average rosin droplet decreases. It is quite surprising that a simple device such as an ordinary centrifugal pump is capable of emulsifying rosin to a particle size of less than about ten microns thereby ensuring substantially complete reaction in a fraction of a minute and we thus prefer to operate in this semi-colloidal range.

Any convenient means may be used for dispersing the rosin in the caustic, and devices such as are shown in U. S. Patent Nos. 2,159,670 and 2,088,336 are within the scope of the invention. Moreover, a suitable reactor may be formed by sealing the inlet orifice of a centrifugal pump and feeding molten rosin and hot caustic solution separately through holes drilled in the casing of the pump. The pump casing thus serves as closed circuit reactor. A pipe line agitator may also be used, consisting essentially of a turbine or propeller type stirrer on a shaft inserted through the wall of the pipe at the point where it makes a 90° bend. Rotation of the turbine or propeller at normal speeds of roughly 2,400 R. P. M. provides closed circuit circulation of the material when the diameter of the turbine or propeller is somewhat smaller than the diameter of the pipe or the pipe is suitably enlarged to permit the use of a larger propeller than would otherwise be the case.

It is known that the viscosity of liquid rosin size changes as its water content and amount of free rosin therein are varied. It is thus often advantageous from the point of view of power consumed to perform the saponification at about the point where the viscosity of the size is at a minimum.

The invention will be more particularly illustrated by the examples which follow. These examples are specific embodiments of the invention and are not be be construed as limitations thereon.

*Example 1*

The manufacture of liquid tall oil rosin size of the 70% solids, 15% free acid type is performed as follows according to the present invention.

The apparatus used corresponded to that of the drawing. A Milton-Roy proportioning pump was used to inject molten rosin and caustic solution into the closed circuit reactor. Each side of the pump was protected against overload by a return line closed by means of a pressure-opening valve. An open impeller centrifugal pump (3/4 CG-1 Worthington) driven by a 3 H. P. motor was used as combined circulator and emulsifier. The pump was run at 3500 R. P. M. The proportioning pump, centrifugal pump, and all valves and gauges were traced with ¼" copper tubing through which steam was passed to maintain the temperature of these components at 115° C. or more. These parts (motors excepted) were also packed in thermal insulation.

Tall oil rosin having an acid number of 147 and a specific rotation (in chloroform) of +18 (a commercial product which had been stabilized against crystallization by heating at 200° C. for 30 minutes in the presence of 1.5% by weight of caustic soda) was melted at 130° C. under nitrogen in a 100-gal. stainless steel steam-jacketed kettle. Commercial 50% caustic soda solution was run into the caustic storage tank and diluted to 17.1% by addition of water.

The rosin and dilute caustic were pumped into the closed circuit reactor through the proportioning pump at the respective rates of about 104 pounds and 55 pounds per hour at respective temperatures of 130° C. and 76° C., all air in the lines being vented. The temperature of the reaction was maintained at 114° C. by the use of the heat exchanger. A calculated residence time of 2 minutes in the reactor was allowed, and the discharge was cooled to 96° C. and pumped to a rosin storage tank. Analysis of samples of the discharge showed that all but a trace of the caustic had reacted, saponification thus being substantially complete. The product contained about 14.4% free abietic acid.

A sample of the rosin size thus prepared was tested in comparison with corresponding rosin size prepared by the "cook tank" method. The paper samples obtained were practically indistinguishable, showing that the sizes were substantially the same.

*Example 2*

The procedure of Example 1 was repeated, except that the average residence time of the feed in the reactor was decreased to 10 seconds and the reaction temperature was increased to 120° C. A 100 cc. sample was tapped from the discharge line and found to be a creamy emulsion. The emulsion was maintained at 95° C. for 10 minutes with gentle stirring, at the end of which time analysis showed practically no free caustic indicating that the saponification had gone to substantial completion.

The above rate of production was about equal to one tank car every 40 hours.

*Example 3*

A closed circuit reactor of the pipe line agitator type was fabricated from a 24" long section of 12" (I. D.) black iron pipe by welding a bottom thereto, threading a top thereon, providing two ¾" orifices spaced 6" apart near the bottom for admission of rosin and caustic solution respectively, and a product discharge pipe near the top of the reactor diametrically opposite the two bottom feed pipes. A turbine stirrer driven by a 5 H. P. motor was installed through a stuffing box in the reactor head. The turbine was 4" in diameter and 6" high and was mounted so as to clear the bottom of the reactor by 4". Molten rosin and hot sodium hydroxide solution was applied to this reactor, and product discharged therefrom, as shown in the drawing and Example 1.

The rate of feed was adjusted to provide a residence time of 45 seconds and the stirrer set for 2500 R. P. M. The turbine stirrer proved highly effective in maintaining a closed circuit within the reactor so that the rosin feed was emulsified in the presence of sodium rosinate as in the case of Example 1. The temperature of the reaction was maintained at 120° C. by decreasing the temperature of the caustic solution and increasing the average residence time. Excellent quality liquid rosin size was obtained.

We claim:

1. A process for the continuous manufacture of liquid rosin size which includes the steps of continuously and separately supplying under pressure a molten rosin and a hot aqueous alkali metal alkali solution in proportion to provide a liquid size containing between 50% and 80% by weight of solids and not more than 30% by weight of free rosin into a closed circuit reactor, continuously dispersing said rosin in said solution therein containing an effective amount of autogenously and preformed alkali metal rosinate as dispersing agent for said rosin, and continuously discharging product from said reactor.

2. A process according to claim 1 wherein the rosin is a rosin corresponding to that prepared by reacting 1 mol of a naturally-occurring rosin with 1/12 to one mol of maleic anhydride.

3. A process according to claim 1 wherein the alkali metal alkali is sodium hydroxide.

4. A process according to claim 1 wherein substantially all of the alkali metal alkali reacts with the rosin in the reactor.

5. A process for the continuous manufacture of liquid rosin size, which includes the steps of continuously and separately supplying under pressure a molten rosin and hot aqueous sodium hydroxide solution in proportion to provide a liquid size containing between 50% and 80% by weight of solids and not more than 30% by weight of free rosin into a closed circuit reactor, continuously dispersing said rosin in said solution therein containing an effective amount of autogenously and pre-formed sodium rosinate as dispersing agent for said rosin until only sufficient of said sodium hydroxide has reacted to form a dispersing medium for said rosin, continuously discharging product from said reactor, and maintaining said product at a temperature above about 75° C. at least until reaction of said sodium hydroxide is substantially complete.

6. A process according to claim 5 wherein the product is maintained above 90° C. until reaction of the sodium hydroxide is substantially complete.

7. A method according to claim 1 wherein the particle size of the dispersed rosin is sufficiently small and the amount of alkali metal rosinate sufficiently large that said dispersed rosin remains in dispersed form until substantially all of the alkali in the solution has reacted in less than about two minutes.

8. A method according to claim 5 wherein the particle size of the dispersed rosin is sufficiently small and the amount of alkali metal rosinate sufficiently large that said dispersed rosin remains in dispersed form until substantially all of the alkali in the solution has reacted in less than about two minutes.

References Cited in the file of this patent

UNITED STATES PATENTS

| | | |
|---|---|---|
| 1,929,577 | De Cew | Oct. 10, 1933 |
| 2,254,049 | Schutte | Aug. 26, 1941 |
| 2,383,933 | Bump | Sept. 4, 1945 |
| 2,628,918 | Wilson | Feb. 17, 1953 |

FOREIGN PATENTS

| | | |
|---|---|---|
| 22,547 | Great Britain | 1899 |